United States Patent [19]

Fukuda et al.

[11] Patent Number: 4,843,420
[45] Date of Patent: Jun. 27, 1989

[54] MIRROR DEVICE FOR A CAMERA

[75] Inventors: Tsuyoshi Fukuda; Masayuki Suzuki; Masayoshi Kiuchi, all of Kanagawa, Japan

[73] Assignee: Canon Kabushiki Kaisha, Tokyo, Japan

[21] Appl. No.: 267,737

[22] Filed: Nov. 3, 1988

Related U.S. Application Data

[60] Continuation of Ser. No. 27,931, Mar. 19, 1987, abandoned, which is a division of Ser. No. 750,754, Jun. 28, 1985, abandoned.

[30] Foreign Application Priority Data

Jul. 6, 1984 [JP] Japan .................................. 59-102158
Jul. 6, 1984 [JP] Japan .................................. 59-102159
Jul. 11, 1984 [JP] Japan .................................. 59-104979
Jul. 11, 1984 [JP] Japan .................................. 59-104980

[51] Int. Cl.$^4$ ...................... G03B 7/099; G03B 19/12
[52] U.S. Cl. .................................. 354/479; 354/152
[58] Field of Search ................................ 354/152, 479

[56] References Cited

U.S. PATENT DOCUMENTS 4,293,209 10/1981 Kurei ..................................... 354/153
4,320,945 3/1982 Kimura ............................ 354/152 X Primary Examiner—Michael L. Gellner
Attorney, Agent, or Firm—Fitzpatrick, Cella, Harper & Scinto

[57] ABSTRACT

A mirror device for a camera having a first mirror arrangement pivotable from a finder-viewing position to an exposure or retracted position, and a second mirror arrangement pivotable with its fulcrum formed on the first mirror arrangement. While the first mirror arrangement moves pivotally from the finder-viewing position to the exposure or retracted position, the second mirror arrangement is pivotally moved from a resting position in contact with the first mirror arrangement as it is open, through a sliding movement on a camming surface of the camera body to a closing position for a half-mirrored portion of the first arrangement.

14 Claims, 16 Drawing Sheets

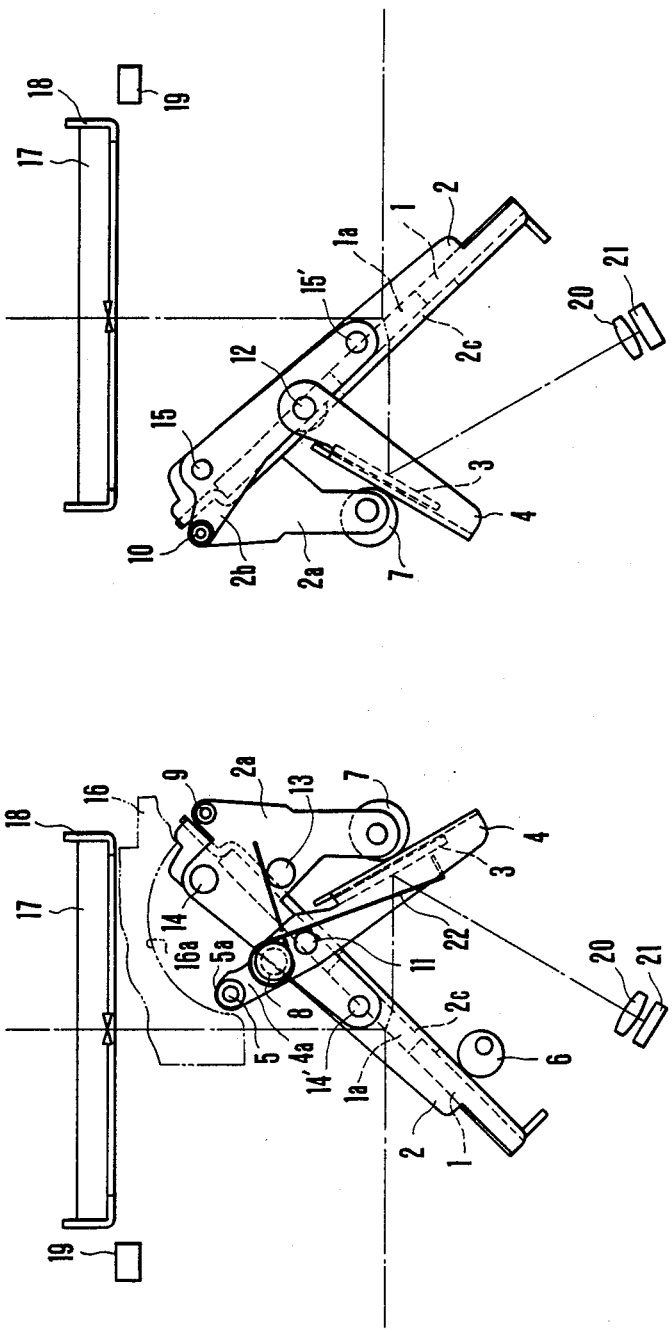

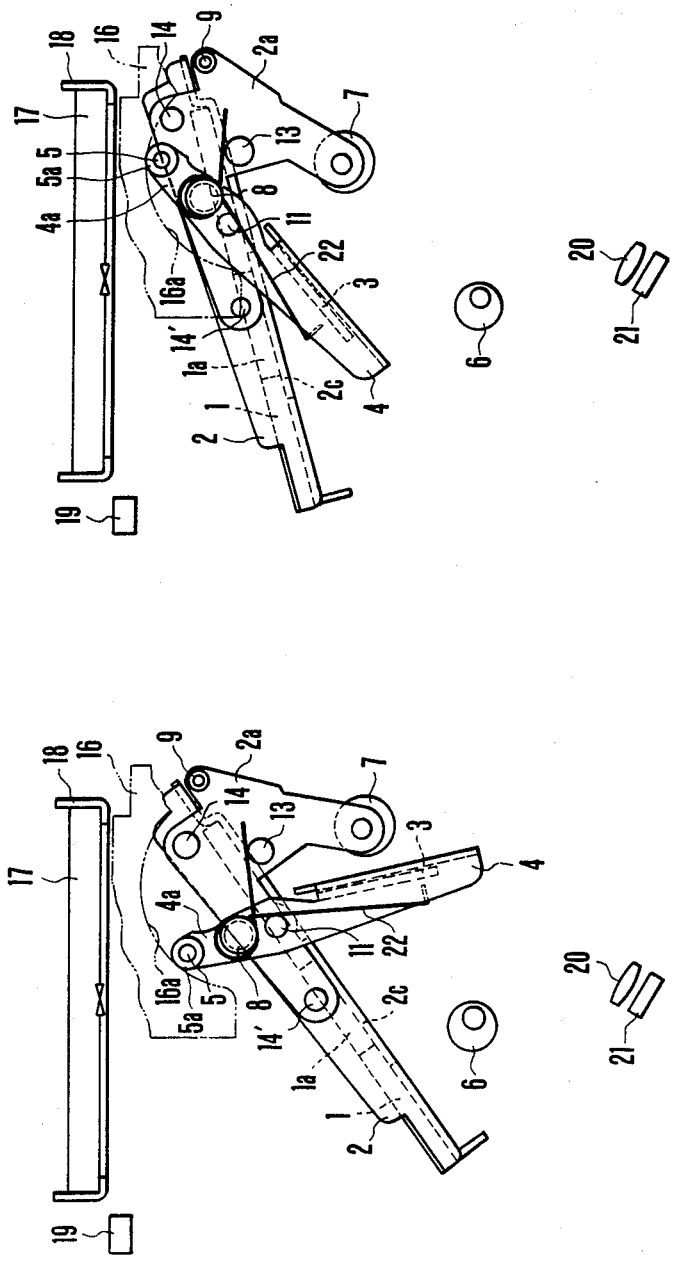

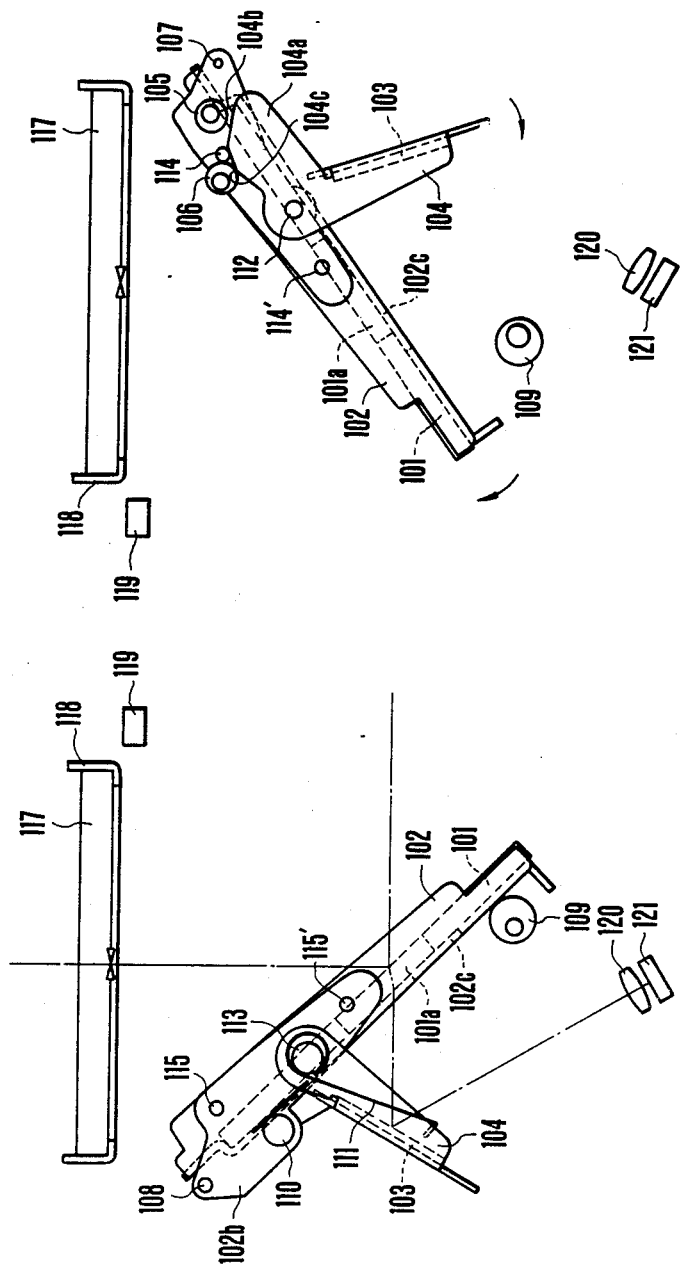

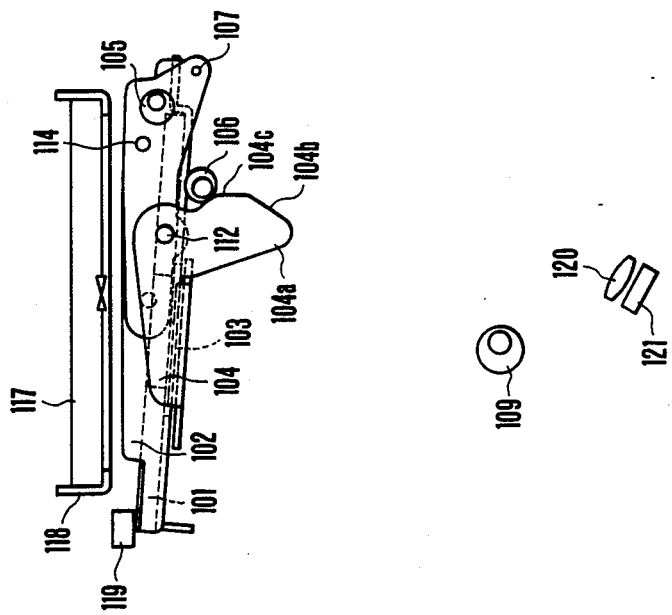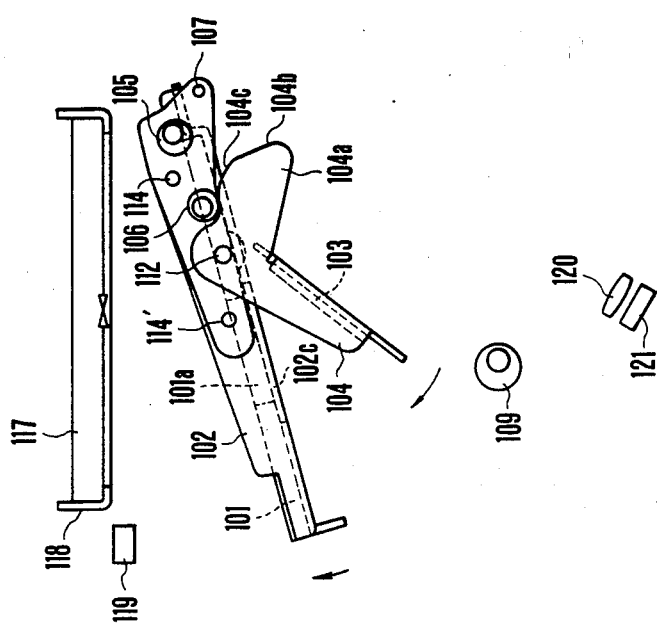

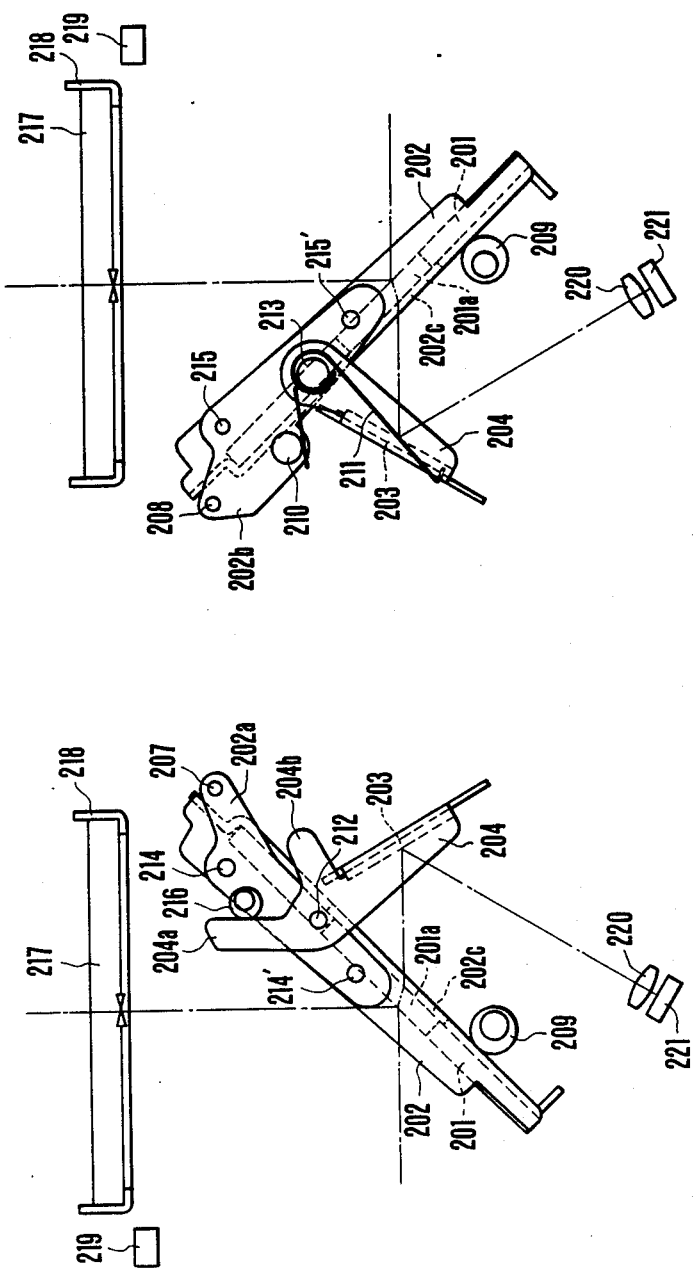

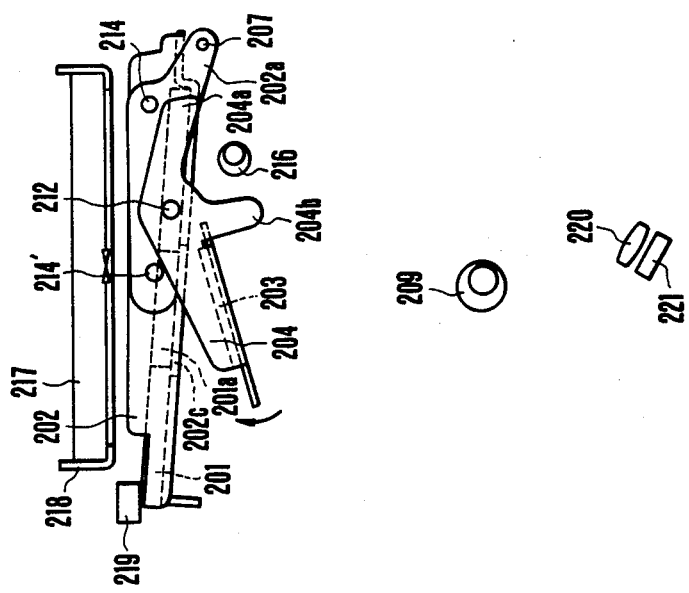
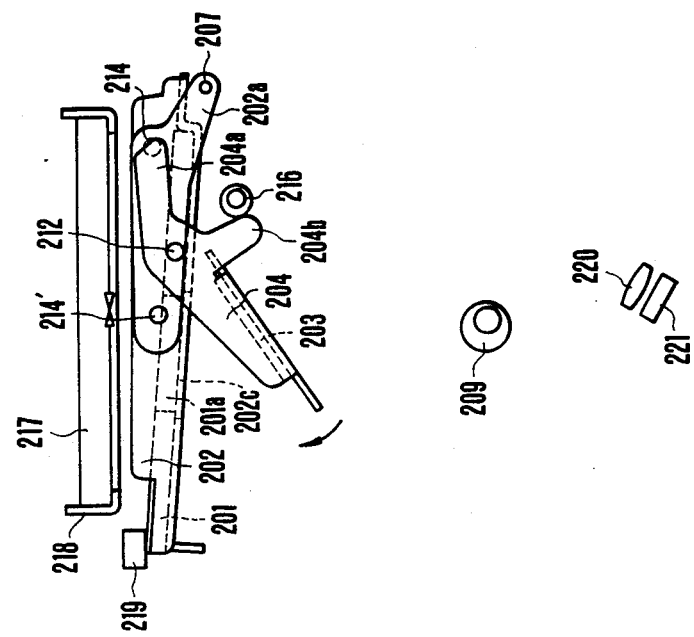

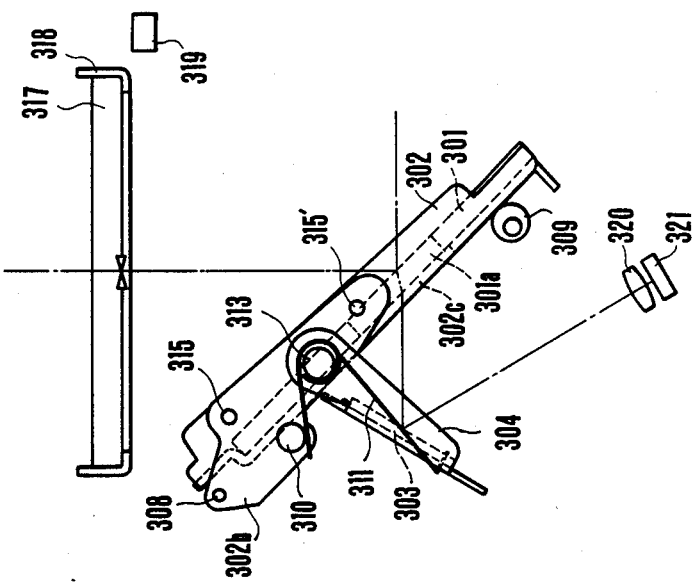
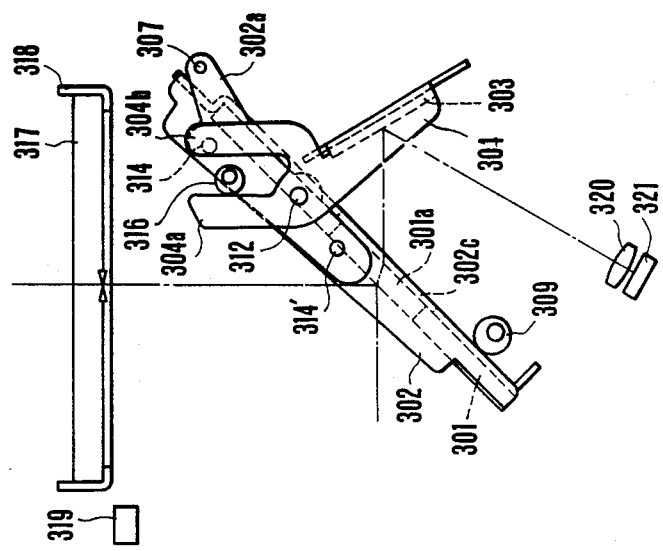

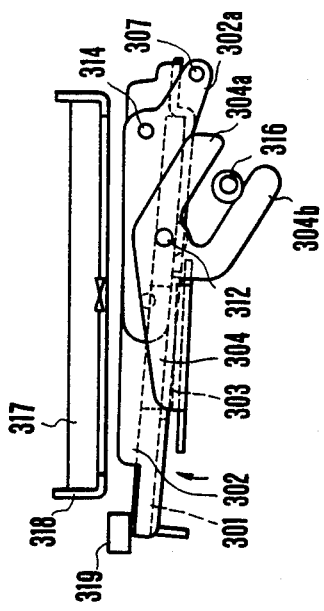
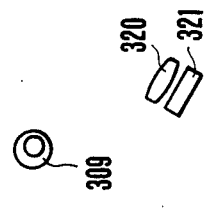
FIG.13D
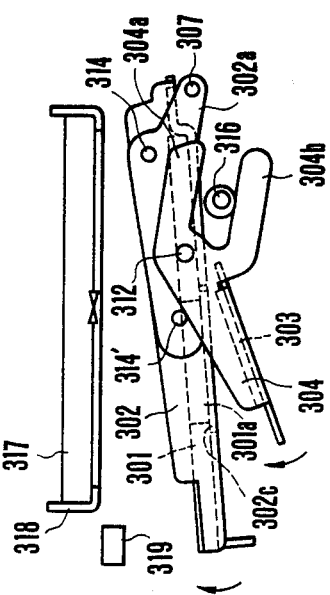
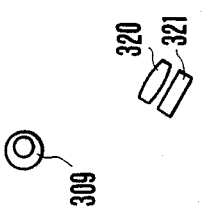
FIG.13C

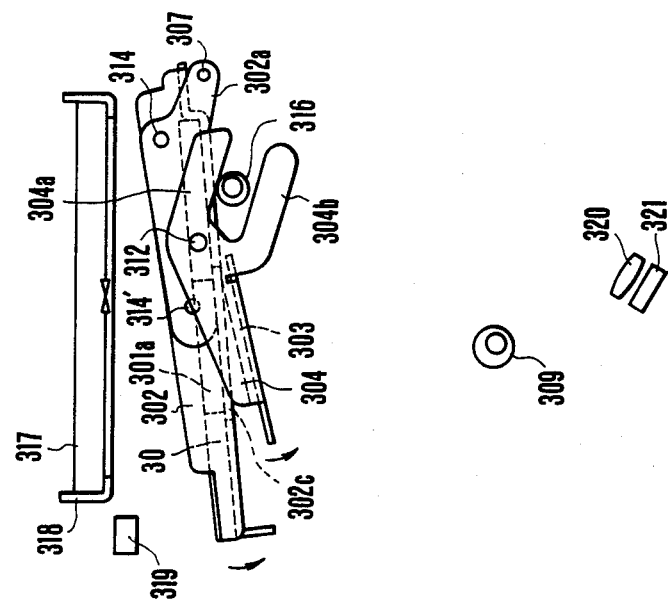
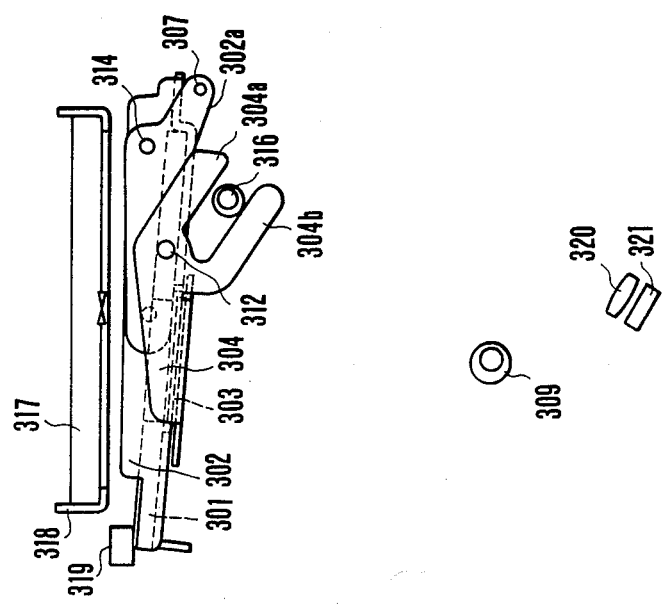

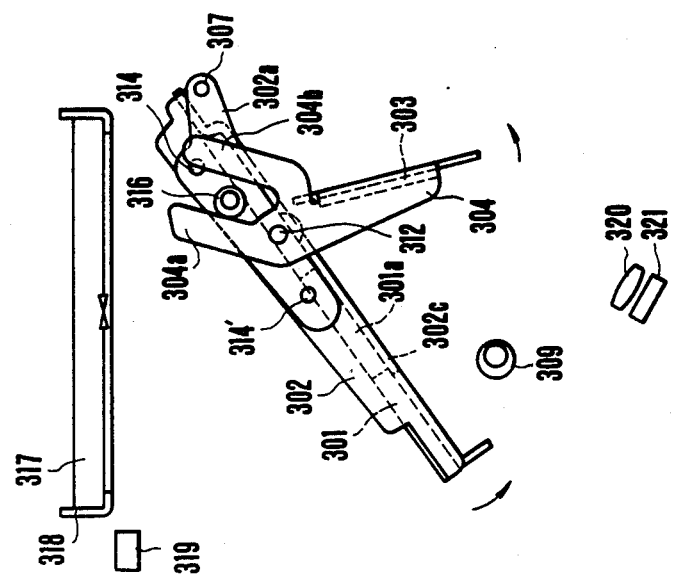

MIRROR DEVICE FOR A CAMERA

This application is a continuation of application Ser. No. 027,931 filed 3/19/87, which is a divisional of Ser. No. 750,754, filed June 28, 1985, both abandoned.

BACKGROUND OF THE INVENTION

1. Field of the Invention

This invention relates to a mirror device for a camera having a first mirror arrangement flippable from a finder-viewing position to an exposure allowing or retracted position and a second mirror arrangement flippable relative to this or first mirror arrangement.

2. Description of the Prior Art

Recently, there have been proposed single lens reflex cameras in which a first mirror that partly permeates light is arranged to pivotally move from the finder-viewing position to the light path-to-film clearing position and a second mirror is mounted on the first mirror and arranged to be pivotable from a position where the light permeating from the first mirror in the finder is directed to a photosensitive element for light metering or range finding.

In the single lens reflex cameras of this kind, one of the prior known methods for determining the terminal ends of pivotal movement of the second mirror is that as described in U.S. Pat. No. 4,293,209, wherein the second mirror is urged by a spring to open relative to the first mirror and further a camming surface is formed on the framework of the camera, whereby the second mirror is brought into, and always maintained in, sliding movement on the camming surface, so that the opening angle of the second mirror in the finder-viewing position of the first mirror is determined, and when in the non-viewing position, the second mirror is held against the bias force of the spring. However, as is well known, the accuracy with which each mirror is located in the ends of pivotal movement must be very high. The use of only one camming surface for defining the opening and closing positions of the second mirror as in the aforesaid prior known proposal, therefore, leads to difficulty in making adjustment against the tolerances for the dimensions and the location of the parts. In more detail, when the angular position of the second mirror relative to that camming surface has been adjusted, for example, in the opening end, it is at the closing end that a location error takes place. If this error were corrected, the once-established adjustment of the opening position would be broken. In order to allow for both of the positions to be adjusted with high accuracy as it should be in actual practice, the necessity of using an additional mechanism of complex structure arises. Another problem is that the adjusting operation in the assembly line becomes troublesome and time-consuming.

Yet another problem of the aforesaid prior known proposal is that as the first mirror moves toward the nonviewing position with increasing speeds, when it happens that the prescribed point is overrun slightly by inertia, that camming surface urges the second mirror also to move beyond the limit of a range of movement thereof with exertion of more forces than necessary for holding it in the closing position, because these forces deform the second mirror. To avoid this, there is a need to add surplus means of complicated structure, affecting the production cost and the availability of space.

Another example of a proposed method is in U.S. Pat. No. 4,320,945 wherein use is made of a toggle mechanism, whereby the direction to which the second mirror is urged is changed at an intermediate point during the pivotal movement of the first mirror. That is, as the first mirror pivots toward the non-viewing position, after it passes that point, the force of the drive spring acts on the second mirror in a direction to close. Conversely when moving to the viewing position, the force changes its direction at that intermediate point. From this time onward, the second mirror is driven to move away from the first one. And, according to this proposal, what is necessary for locating the second mirror when in the viewing position, is only a pin fixedly secured to the framework of the camera. Besides this, the mirror apparatus is necessarily provided with means for causing the second mirror to follow up the first mirror until the prescribed point as the first mirror pivots in either direction.

However, in the second proposal, because the spring for the second mirror changes over between pushing and pulling at an intermediate point during the opening or closing operation, there is produced a problem that no smooth mirror operation is obtained.

Also, in the second proposal, the spring of the second mirror must be connected at the opposite end to the framework of the camera. Therefore, the step of installing the mirror device within the interior of the camera housing must be followed by a step of mounting that spring between the second mirror support and the framework of the camera housing, giving rise to a problem in that the efficiency of the assembly line is reduced remarkably.

Another problem is that because that spring must be constructed in the form of the bias spring of the toggle mechanism, a spring with a long leg is selected for employment as that spring, worsening the space efficiency. This becomes serious when the bulk and size of the camera is to be minimized.

SUMMARY OF THE INVENTION

A first object of the present invention is to provide a mirror device which enables the accuracy of location of the second mirror to be improved, and the adjustment in position of the second mirror at the opening end to be made before the mirror device is built into the camera housing, whereby the quickness and ease of the adjusting operation on the assembly line is greatly improved.

A second object of the present invention is to provide a mirror device in which the second mirror is arranged to start early to pivotally move as the first mirror moves from the finder-viewing position to the exposure or retracted position.

Other objects of the invention will become apparent from the following detailed description of embodiments thereof.

BRIEF DESCRIPTION OF THE DRAWINGS

FIG. 1 is a one side view of a first embodiment of the mirror device according to the present invention.

FIG. 2 is an opposite side view of the mirror apparatus of FIG. 1.

FIGS. 3A, 3B and 3C illustrate a manner in which the mirror device of FIG. 1 operates.

FIG. 5 is an opposite side view of the device of FIG. 4.

FIGS. 6A, 6B and 6C illustrate a manner in which the device of FIG. 4 operates.

FIG. 7 is a one side view of a third embodiment of the mirror device according to the present invention.

FIG. 8 is an opposite side view of the device of FIG. 7.

FIGS 9A to 9E and FIGS. 10A to 10C illustrate a manner in which the mirror device of FIG. 7 operates.

FIG. 11 is a one side view of a fourth embodiment of the mirror device according to the present invention.

FIG. 12 is an opposite side view of the device of FIG. 11.

FIGS. 13A to 13E and FIGS. 14A to 14D illustrate a manner in which the mirror device of FIG. 11 operates.

DETAILED DESCRIPTION OF THE PREFERRED EMBODIMENTS

Figure 4:
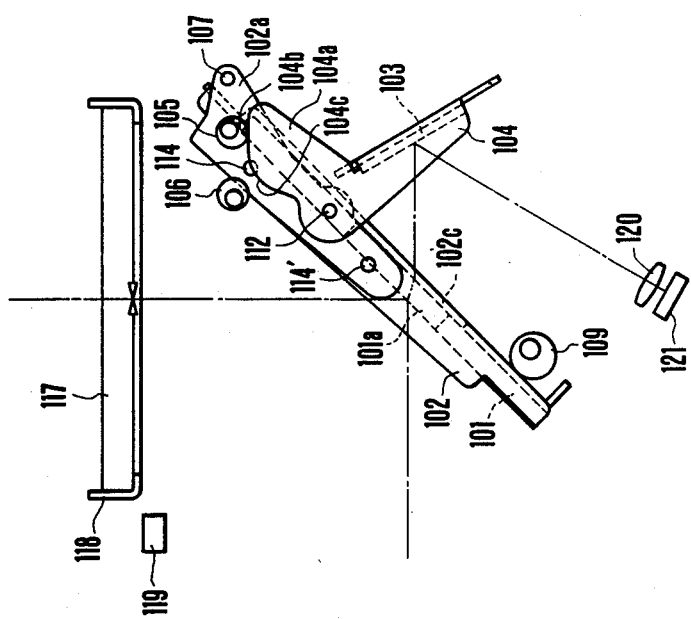
FIG. 4 is a one side view of a second embodiment of the mirror device according to the present invention.

The present invention will next be described in connection with embodiments by reference to the drawings.

FIGS. 1 and 2 in side elevational views seen from the left and right of the mirror device respectively illustrate a first embodiment of the invention. In the drawings, a first mirror 1 is arranged upon setting in a finder-viewing position of FIG. 1 to reflect light entering through an objective lens to a finder optical system and is constructed with a semi-transparent area 1a so that the light is partly directed to a second mirror 3. A support member 2 for the first mirror 1 has an aperture 2c in alignment with the semi-transparent area 1a and is fixedly secured to levers 2a and 2b by rivets 14, 14', 15 and 15' with their pivot pins 9 and 10. The second mirror 3 is reflective in the entire area thereof and is so oriented that the light transmitted through the first mirror 1 goes through a collection lens 20 to a photosensitive element 21. A support member 4 for the second mirror 3 is pivotally mounted on pins 11 and 12 which are fixedly mounted on the first mirror support member 2. This support member 4 is provided with a pin 5 fixedly mounted on an armed portion 4a and arranged upon contact with a camming surface 16a formed in a portion of a base plate 16 fixedly mounted to the camera housing to determine the position of the second mirror 3 when moved upward. A collar 5a is rotatably fitted on the pin 5, and it is this collar that moves along the camming surface 16a. The armed portion 4a and the pin 5 each are two in number, the others being on the opposite side though not shown in FIG. 2 for the purpose of clarity. An eccentric pin 6 is able to finely adjust the angular position of the first mirror support frame 2 so that a finder image on a focusing screen 17 is equivalent in location to an image on a film plane, as the support frame 2 is turned in a counterclockwise direction by a spring (not shown) to abut on the pin 6. Another eccentric pin 7 is able to adjust the angular position of the second mirror support frame 4 and is rotatably mounted on the first mirror support frame 2 at an armed portion 2a. A pin 8 on which a torsion spring 22 is held is fixedly mounted on the armed portion 4a of the second mirror support frame 4. The hinge pins 9 and 10 mounted on the respective arms 2a and 2b of the first mirror support frame 2 function as the center of rotation of the first mirror 1. The pins 11 and 12 mounted on the first mirror support frame 2 function as the center of rotation of the second mirror support frame 4. Another pin 13 extends from the arm 2a into the path of movement of a mirror-up member (not shown). 14, 14' and 15, 15' are the rivets. The base plate 16 fixedly mounted to the camera housing is provided with the camming surface 16a for controlling the movement of the second mirror 3 in such a way that soon after the first mirror support frame 2 has started to flip from the viewing position of FIG. 1, the collars 5a on the second mirror support frame come to ride on the camming surface 16a, and, as the support frame 2 further turns toward the exposure or non-viewing position, the second mirror support frame 4 is driven to turn in a direction to close the half-mirrored area 2c against the force of the torsion spring 22. 17 is the focusing screen mounted on a holder 18. A stopper 19 of elastic material limits the non-viewing position of the mirror device when the free end of the first mirror support frame 2 abuts against it. The collection lens 20 constitutes part of, for example, a light metering system, and focuses the reflection of the transmitted light from the second mirror 3 to the photosensitive element 21. The spring 22 urges the second mirror support frame 4 in a direction to open away from the first mirror support frame 4 and is carried on the pin 8 with its one end abutting on the frame 4 and the other end abutting on the pin 13.

The mirror device of this or first embodiment is constructed in such a way as described above, and operates in such a manner as will be described below.

First explanation is given to the upward moving operation of the mirror device, or the operation from the finder viewing position to the exposure or retracted position.

Soon after the first mirror has started to move upward by a control means (not shown) acting on the pin 13, it is at a position of FIG. 3A that the collar 5a starts to touch the camming surface 16a. Therefore, the second mirror support frame 4 starts to turn in a closing direction (clockwise direction) against the bias force of the spring 22. And, further upward movement of the first mirror 1 causes further closing movement of the second mirror 2 as shown in FIG. 3B. When the first mirror 1 reaches the upper terminal end of movement, or its frame 2 comes to contact with the stopper 19, the second mirror support frame 4 almost perfectly overlaps the first support frame 2. Thus, the operation of clearing the first and second mirrors from the path of light to the film gate is terminated.

In order to adjust the angular position of the second mirror 3 at the aforesaid upper terminal end of movement of the first mirror so that the backward light from the finder optical system does not leak up to the film, as the second mirror support frame 4 just closes the half-mirrored area 2c, the only requirement is to choose an appropriate diameter of the collar 5a.

Next explanation is given to the downward operation of the mirror device, or the operation from the exposure position to the finder viewing position.

Figure 3C:
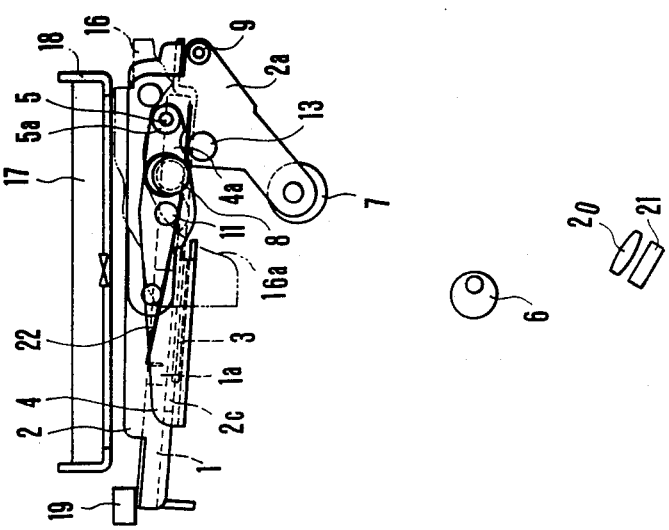

With the device in the exposure position of FIG. 3C, when the control means is taken out of engagement with the pin 13, the first mirror 1 starts to move downward with the help of a return spring (not shown) acting on the pin 13. Thereby, the second mirror support frame 4 moves for now in the opposite direction to open until the position of FIGS. 1 and 2 is reached, or the first mirror support frame 2 rests in abutting contact on the pin 6 and the second mirror support frame 4 on the pin 7.

The angle of the first mirror in the viewing position can be adjusted by turning the eccentric pin 6, while the angle of the second mirror 3 with the first mirror 1 can be adjusted by turning the eccentric pin 7. The latter adjustment is carried out before the mirror device is built into the camera body, that is, in the state of the unit. Therefore, it is very easy to perform the adjusting operation.

Though, in the aforesaid first embodiment, the first and second support frames 2 and 4 are constructed in the pivotal form, they may be otherwise moved by a link mechanism to effect an equivalent result.

As has been described above, the first embodiment has the feature that the opening position of the second mirror is determined by the abutment formed on the first mirror support frame, and the pivotal movement of the second mirror is controlled by the camming surface which is formed in the framework of the camera housing, thereby giving an advantage that the opening and closing positions of the second mirror can be adjusted independently of each other. This makes it possible to achieve a great increase in the accuracy of location control very easily. Another advantage arising from the aforesaid feature is that since the fine adjustment of the opening position of the second mirror can be made to perform before the mirror is assembled with the camera body, the efficiency of the assembly line can be largely improved. Also, since, in the first embodiment, the aforesaid camming surface is used only for determining the closing position of the second mirror, the linkage between the frame 4 and the follower 5a, namely, the armed portion 4a, may be formed to any desired length. If this length is made somewhat long, it is possible to provide a mirror device which gives the camera little influence due to the wearing of the slidable member (collar 5a) and the precision accuracy of the parts.

FIGS. 4 and 5 in the side elevational views seen from the left and right respectively illustrate a second embodiment of the mirror device according to the present invention. FIGS. 6A to 6C illustrate the other various operative positions of the mirror device of FIGS. 4 and 5.

The first mirror 101 when in the viewing position of FIG. 4 reflects light from the photographic lens to the focusing screen 17. A central portion 101a of the area of the first mirror 101 is made semi-permeable to split off part of the light to the second mirror 103 past the apertured portion 102c of the bracket 102, and therefrom to the phostosensitive element 121 past the collection lens 120. The bracket 102 is fixedly carried on two levers 102a and 102b by pairs of rivets 114 and 114′, and 115 and 115′. The levers 102a and 102b are pivotally mounted on respective stub shafts 107 and 108. In FIG. 4 and FIGS. 6A to 6C, the lever 102b is not shown for the purpose of clarity. The second mirror 103 is totally reflective over the entire area thereof, and is supported on a bracket 104 which is pivotally movable about stub shafts 112 and 113 mounted on the first bracket 102. The second bracket 104 has an arm 104a with an edge portion 104b arranged to abut on an eccentric pin 5 when in the viewing position, and another edge portion formed to a camming surface 104c for moving the second mirror 103 to the closing position in cooperation with an eccentric pin 106. These eccentric pins 105 and 106 are able to finely adjust the angular position of the second mirror 103 at the respective ends of pivoted movement thereof. In more detail, when in the finder-viewing position, the abutting portion 104b of the second bracket 104 comes to contact with the pin 105, thereby the angle of the second mirror 103 to the first mirror 101 is determined. To finely adjust this angle, the operator needs only to turn the pin 105 relative to the lever 102a. As this first mirror 101 nears the uppermost or nonviewing position, the camming surface 104c of the second bracket 104 comes to sliding contact with the pin 106. In the uppermost position, the angle of the second mirror 102 to the first mirror 101 can be adjusted to zero by turning the eccentric pin 106. Yet another eccentric or adjusting pin 109 determines the finder-viewing position of the first mirror bracket 102. A return spring 111 urges the second bracket 104 to move away from the first bracket 102, being supported on the pin 113 at the center with its one end held by the second bracket 104 and its other end held by the pin 110. 119 is the stopper of elastic material for limiting the upper position of the first mirror 101 as the first bracket 102 abuts at its free end on it. The reflection of the transmitted light through the area 101a from the second mirror 103 is focused by the lens 120 on the photosensitive element 121.

The operation of the device of FIGS. 4 and 5 is as follows: As the first mirror 101 is turned upward (in the clockwise direction as viewed in FIG. 4) by a control means (not shown) acting on the pin 110, it is at an intermediate operative position of FIG. 6A that the camming surface 104c comes to contact with the pin 106 and the second mirror 103 starts to turn in the clockwise direction (FIG. 6A) against the bias force of the spring 111. As the first mirror 101 further turns upward, the second mirror 103 passes through an intermediate position of FIG. 6B. When the first mirror 101 has moved the total possible distance, or when the free end of the bracket 102 comes to contact with the stopper 119 as shown in FIG. 6C, the second mirror 103 is almost completely superimposed on the back of the first mirror bracket 102 to close the half-mirrored area 101a. Thus, the camera is made ready to make an exposure.

If the second mirror 103 is either excessively pressed against, or spaced by an appreciable distance from, the back surface of the first mirror bracket 102, the artisan needs only to turn the eccentric adjusting pin 106.

Then, when the control means moves away from the pin 110, because the pin 113 is urged by a return spring (not shown), the first mirror 101 starts to move downward. Thereby the second mirror 103 starts to turn for now in the opposite direction to open. Then when the first mirror 101 reaches the viewing position of FIG. 4 with the free end of the bracket 102 on the pin 109, the second mirror bracket 104 too returns until it rests on the pin 105.

If the angle of the first mirror 101 in the viewing position is not proper, the artisan needs only to turn the eccentric adjusting pin 109. Then, if the angle of the second mirror 103 in that position is not proper, he needs only to turn the eccentric adjusting pin 105. It should be recognized that these adjusting operations can be carried out before the mirror device is assembled with the camera housing, and, therefore, are very easy operations.

Though in the second embodiment, the first and second mirror support means are constructed in the pivotal form, it is also possible to use a link type operating mechanism therefor.

As has been described above, the second embodiment has the feature that the opening position of the second mirror is made determined by the abutment formed in the first mirror support means, and its closing position is made determined by the abutment formed in the framework of the camera housing, so that the opening and closing positions of the second mirror can be adjusted independently of each other, thereby giving an advantage of achieving a great increase the accuracy of location very easily. Another advantage arising from the use of the aforesaid feature is that the adjusting operation for the opening position of the second mirror relative to the first mirror can be performed before the mirror device is assembled within the camera housing, whereby the efficiency of the assembly line is remarkably improved. Another feature of the second embodiment is that the aforesaid cam portion is effective only for bringing the second mirror to the closing position, and the opening and closing positions of the second mirror are made adjustable by separate means from each other in the form of the pins 5 and 6 respectively. This makes it possible to take the distance from the pivot to the cam portion of the second mirror bracket at any desired value, thereby giving an advantage of providing a mirror device of improved precision accuracy when that distance is somewhat long, because the influence by the wearing and the tolerances of the parts such as the cam 104c and the pin 106.

FIGS. 7 and 8 in the left and right side views illustrate a third embodiment of the mirror device according to the present invention, and FIGS. 9A to 9E and 10A to 10C illustrate a manner in which the device of FIGS. 7 and 8 operates.

The mirror device comprises a first mirror 201 having a half-mirrored portion 201a at the center of the entire area thereof and arranged upon setting in the viewing position to reflect light from a photographic lens to a focusing screen 217, while the transmitted part of the light through the area 201a goes to a second mirror 203. The first mirror 201 is supported by a bracket 202 having an apertured portion 202c in alignment with the half-mirrored area 201a. Stub shafts 207 and 208 as the center of rotation of the first mirror 201 are fixedly mounted on respective arms 202a and 202b which are fixed secured to the bracket 202 by respective pairs of rivets 214 and 214', and 215 and 215'. In FIG. 7 and FIGS. 9A to 9E, the illustration of the arm 202b is omitted for the purpose of clarity. The second mirror 203 is totally reflective, and is supported by a second bracket 204 which is pivotally mounted on stub shafts 212 and 213 fixedly mounted on the first bracket 202. The second bracket 204 has a first leg portion 204a and a second leg portion 204b. The viewing position of the first mirror 201 is determined by an eccentric pin 209 when the first bracket 202 is turned by a spring (not shown) held by a pin 210 on the arm 202b in the counter clockwise direction to abut on the pin 209. By turning the pin 209 about its own axis, the angular position of the first mirror 201 can be finely adjusted. A spring 211 urges the second bracket 204 to collapse on the first bracket 202, and is supported on a pin 213 with its one end held by the second bracket 204 and its other end held by a pin 210. An eccentric adjusting pin 216 is mounted to the camera housing, and has two functions, one of which is to determine the opening position of the second mirror 203 in engagement with the first leg 204a of the bracket 204 and hold it in this position against the bias force of the spring 211, and the other of which is to close the second mirror 203 early in engagement with the second leg 204b when the first mirror 101 moves to the non-viewing position. The focusing screen 217 is supported by a holder 218. An elastic member 219 limits the upward movement of the first mirror bracket 202 when the front end of the bracket 202 abuts on it. A collection lens 220 constitutes, for example, a light metering system together with a photosensitive element 221.

Figure 9A:
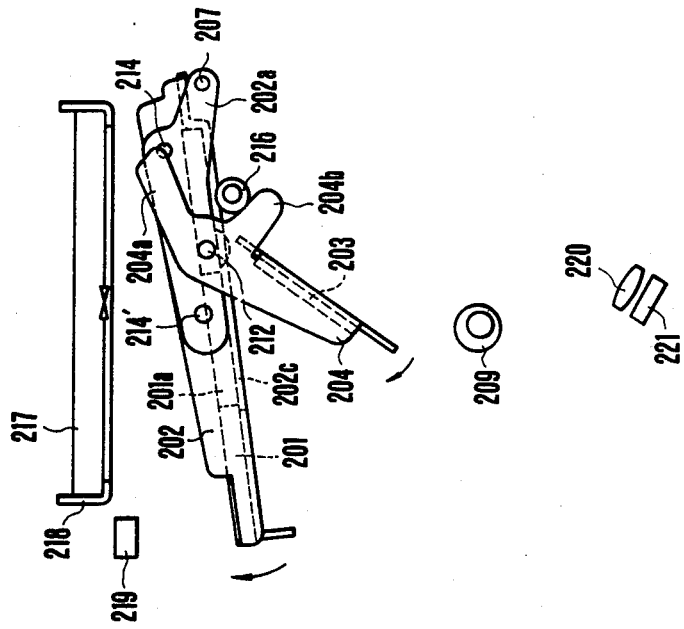
Figure 9B:
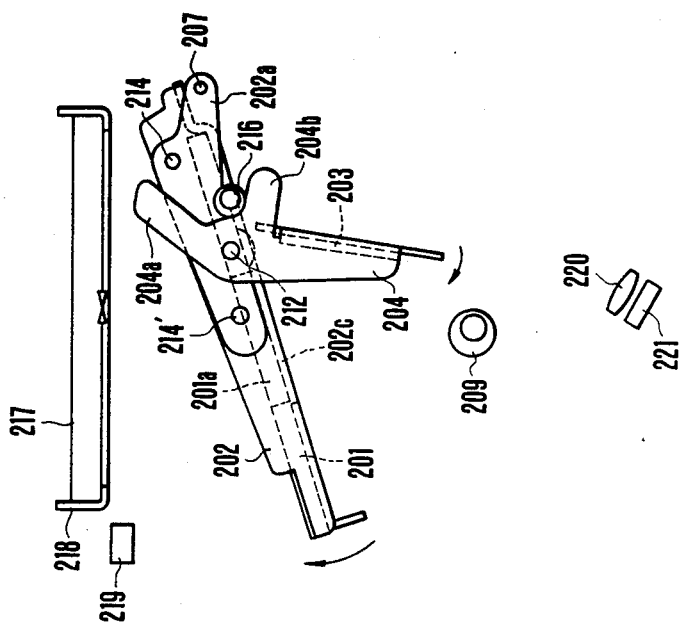
Figure 9E:
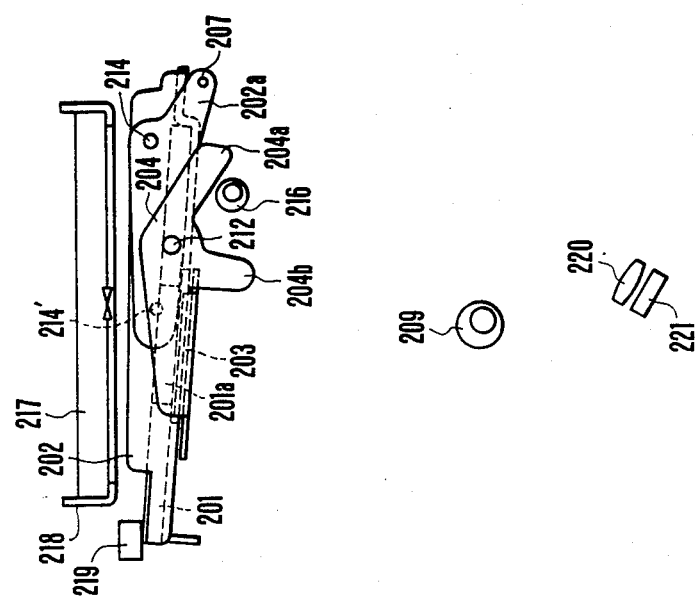

The operation of the mirror device of such construction is next described by reference to FIGS. 9 and 10. As the first mirror 101 is moving upward (in the clockwise direction) with the driving force on the pin 210, it is at an operative position of FIG. 9A that the side edge of the second leg 204b starts to abut on the pin 216. In this connection it should be explained that, in general, the speed at which the first mirror bracket 202 moves upward is very fast, causing the second mirror bracket 204 to be retarded by its inertia despite the second bracket 204 being driven by the spring 211 in the closing direction. To avoid this use is made of the second leg 204b arranged to push the second bracket 204 so that the speed at which the second mirror 203 moves in the closing direction is increased. As the first mirror 201 further goes on, the pushing of the second mirror bracket 204 continues as shown in FIG. 9B until the first mirror bracket 202 moves the total distance upward and abuts on the stopper 219 as shown in FIG. 9C. After that, the driving force for the second mirror bracket 204 is supplied only by the spring 211. Therefore, the second mirror bracket 204 is further turned past a position of FIG. 9D to a position of FIG. 9E where the second mirror 203 almost perfectly superimposes the first bracket 202.

It is to be noted here that such superimposing relationship is maintained proper by the spring 22, whereby the backward light from an eyepiece is prevented from leaking into the mirror box. It is also to be noted that even if the first bracket 202 is turned by the action of its inertia beyond the upper end of movement as the elastic stopper 219 is bent upward, no more force than necessary to the closing direction is exerted on the second bracket 204. Therefore, the conventional problem that the second bracket is deformed by the wrong reacting force is not encountered in the present invention.

Also, the use of the second leg 202b for urgent movement of the second bracket 204 in cooperation with the pin 216 provides not only the above-described advantage of increasing the speed, but also an additional advantage of preventing the tip of the first leg 204a from striking the focusing screen holder 218.

Figure 10A:
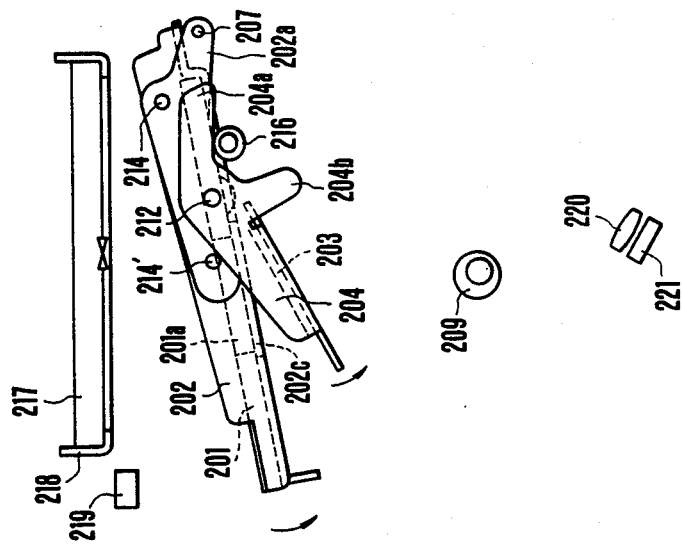
Figure 10C:
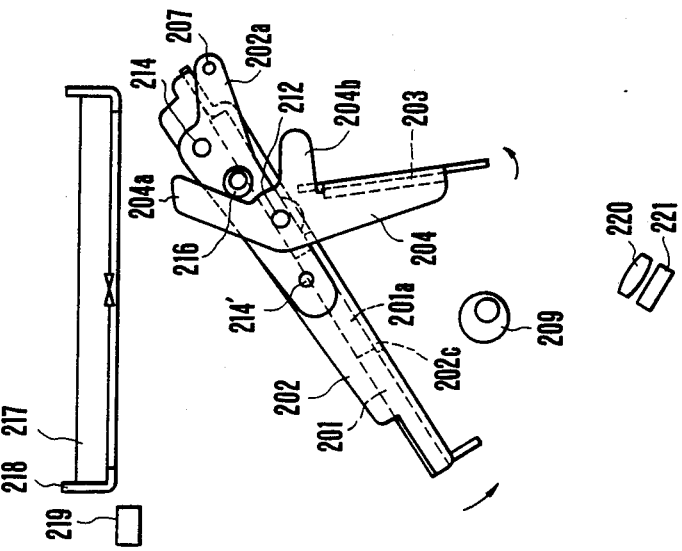
Figure 10B:
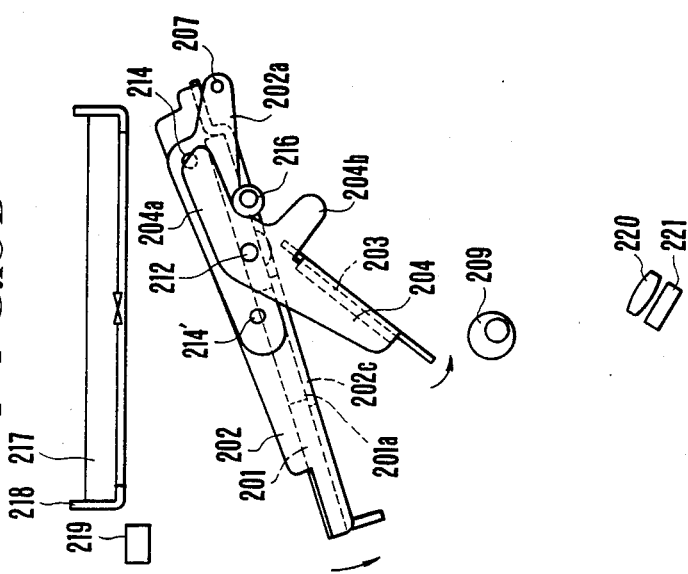

Next described is the returning operation of the mirror device. FIG. 10A illustrates an early stage of downward (counterclockwise) movement of the first mirror bracket 202 where the second mirror bracket 204 starts to turn in the opening direction when the first leg 204a abuts on the pin 216. And, the angle of the second mirror 203 with the first mirror 201 increases continuously as the first mirror 201 goes downward as shown in FIGS. 10B and 10C, until the initial position of FIG. 7 is reached. Therefore, the position of the second mirror 203 for the viewing position is determined by the location of the pin 216.

It should be recognized that the angle of the first mirror 201 with the optical axis in the viewing position can be finely adjusted by an easy method, or by turning the eccentric pin 209, and the angle of the second mirror 203 with the optical axis in the same position can also be finely adjusted only by turning the eccentric pin 216.

Though, in the third embodiment, the first and second mirror support brackets 202 and 204 are constructed in the pivotal form, they may be otherwise constructed by using a link mechanism to effect an equivalent result.

As has been described above, one of the features of the third embodiment is that the second mirror is urged in the closing direction, and its opening position is determined by the first abutment portion in cooperation with the pin which is mounted to the camera housing. Another feature is that the second mirror support means is provided with a second abutment arranged to cooperate with that pin in such a manner that the second mirror is not retarded. These features make it possible to omit the operation of adjusting the closing position of the second mirror and to adjust the opening position by the means solely used therefor, thereby giving an advantage of achieving a great increase in the accuracy of position control very easily. Another advantage is that even if the first mirror overruns the prescribed upper terminal end of movement thereof by its inertia, no unduly large force is applied to the operating mechanism for the second mirror. Therefore, the deforming problem or the like does not arise, and no additional means for avoiding the deforming problem is necessary.

Another advantage arising from the second feature is that the speed at which the second mirror moves from its opening to its closing position can be made uniform over the entire range of movement, and a mechanical interference between the second mirror support means and the focusing screen holder can be prevented from occurring when the first mirror moves upward. Still another advantage arising from the possibility of installing the spring urging the second mirror in the closing direction before the mirror device is built into the camera housing, is that the efficiency of the assembly line can be improved, and, because of no necessity of an unduly large increase in the space, the space efficiency is improved. Thus, the present invention provides a mirror device which does not involve adverse influences to the minimization of the bulk and size of the camera body.

FIGS. 11 and 12 in left and right side elevational views illustrate a fourth embodiment of the mirror device according to the present invention and FIGS. 13A to 13B and FIGS. 14A to 14D illustrate a manner in which the device of FIGS. 11 and 12 operates.

The mirror device comprises a first mirror 301 having a half-mirrored area 301a and supported by a bracket 302, and a second mirror 303 supported by a bracket 304. The first bracket 302 has arms 302a and 302b fixedly mounted thereto by rivets 314, 314', 315 and 315'. Stub shafts 307 and 308 are fixedly mounted on the respective arms 302a and 302b. The second bracket 304 is pivotally movable about stub shafts 312 and 313 fixedly mounted on the left and right side walls of the first bracket 302. The left side of the second bracket 304 is formed with first and second leg portions 304a and 304b. The angle of the first mirror 301 with the optical axis in its viewing position is adjusted by an eccentric pin 309 when the front end of the first bracket 302 abuts on it under the action of a spring (not shown). The angle of the second mirror 303 with the optical axis in the viewing position is adjusted by an eccentric pin 316 on the camera housing when the first leg 304a abuts on it, as a spring 311 urges the second bracket 304 in the closing direction. The pin 316 when in cooperation with the second leg 304b early closes the second mirror bracket 304 as the first bracket 302 moves upward to the exposure position, and prevents it from bounding just when it reaches the uppermost end of movement. A focusing screen 317 is supported by a holder 318. A stopper 319 of elastic material limits the uppermost position of the first mirror bracket 302. In actual practice, the stopper 319 is positioned to engage with the front end of the first bracket 302. A collection lens 320 constitutes an optical system of, for example, a light meter and focuses the light from the second mirror 303 onto a photosensitive element 321.

Figure 13A:
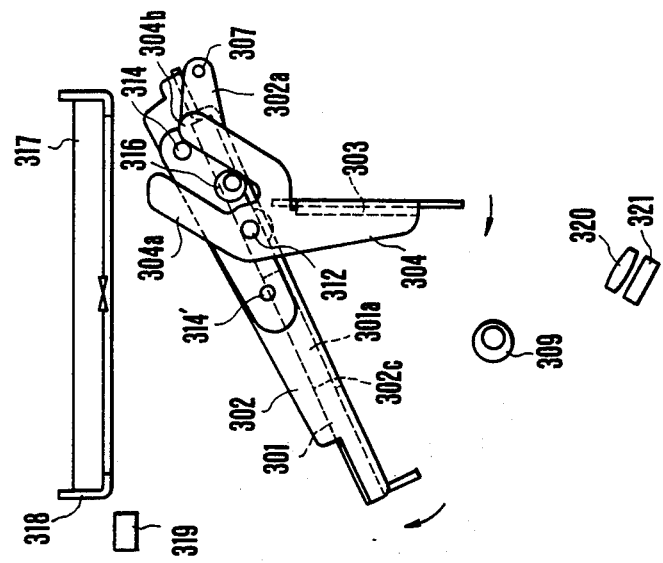
Figure 13B:
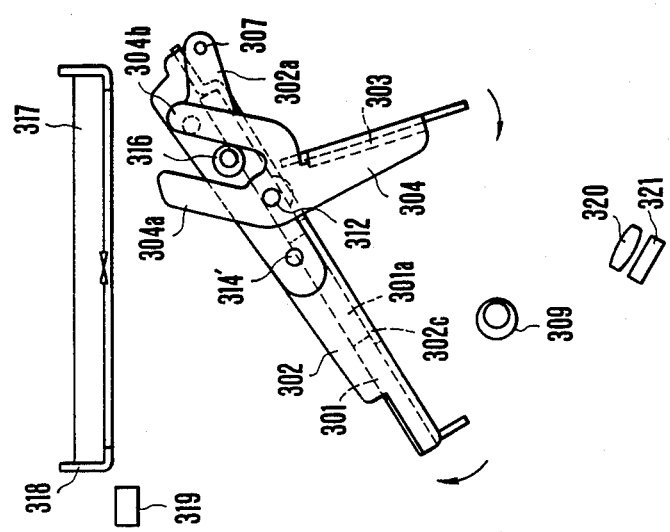

The operation of the mirror device of such construction is as follows: As the first mirror 301 is moving upward from the viewing position, it is at a position of FIG. 13A that the second leg 304b starts to abut on the pin 316. This is because the first mirror bracket 302 moves at a fast speed, causing the second leg 304b to engage the pin 316 despite the second mirror bracket 304 being urged in the closing direction. After that, the second mirror bracket 304 is pushed in the closing direction to speed up its movement to the non-viewing position. And, as the upward movement of the mirror device goes on, the second mirror bracket 304 is further pushed in the closing direction as shown in FIG. 13B. This pushing continues until the first mirror bracket 302 fully moves to engage with the stopper 319 as shown in FIG. 13C. After that, as shown in FIG. 13D, the second mirror bracket 304 continues turning in the closing direction only by this bias force of the spring 311 until it superimposes almost perfectly on the first mirror bracket 302 as shown in FIG. 13E. Thus, the retracting operation to the non-viewing position is terminated.

It should be noted that at the aforesaid terminal end of movement, the second mirror bracket 304 is closed to the first mirror bracket 302 by the spring 311, whereby the backward light from the eyepiece of the finder optical system is prevented from fogging the film when the shutter is opening. Also, even if the first mirror bracket 302 is turned more than necessary by its inertia, no excessive closing force is exerted on the second mirror bracket 304. Therefore, a deformation of the second bracket 304 which was heretofore a serious problem does not take place.

Also, upon arriving at the final or non-viewing position, the second mirror bracket 304 tends to bounce to the opening direction. But, the second leg 304a is blocked by the pin 316 to prevent a harmful bounding from occurring.

It is also to be noted that when the first and second mirrors 301 and 303 move from the viewing to the non-viewing position, the driving force of the spring 311 is combined with that part of the driving force of the spring of the first mirror 301 which is transmitted through the pin 316-and-leg 304b connection to turn the second bracket 304, whereby there is obtained not only the advantage of increasing the speed of movement of the second bracket 304 but also an advantage of avoiding the interference of the first leg 304a with the focusing screen holder 318.

Next described is the returning operation from the non-viewing to the viewing position.

Figure 14C:
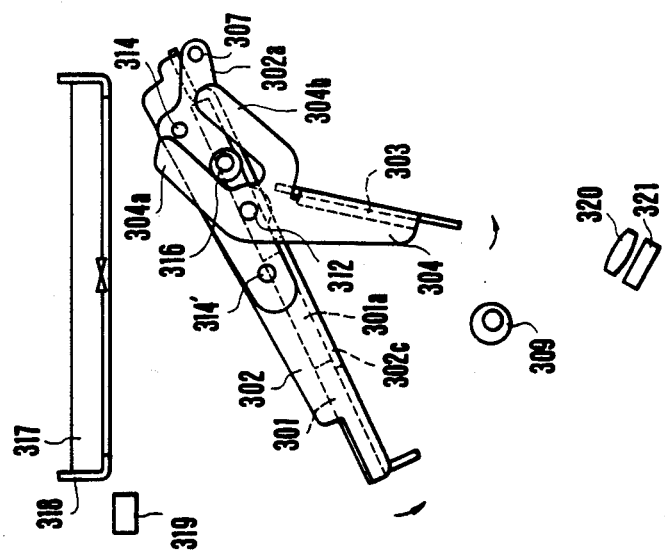
Figure 14B:
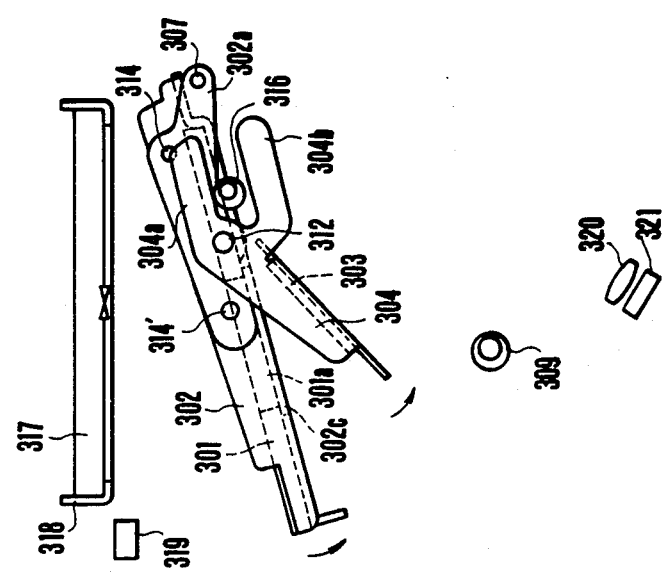

Soon after the first mirror bracket 302 starts to move downward from the position of FIG. 13E, the first leg 304a of the second mirror bracket 304 comes to engage with the pin 316 as shown in FIG. 14A. As the first mirror bracket 302 further moves downward, the second mirror bracket 304 is further turned in the opening direction past positions of FIGS. 14B, 14C and 14D until the position of FIG. 11 is reached, where the first mirror bracket 302 abuts on the pin 309. Therefore, the maximum possible angle of the second mirror 303 with the first mirror 301 is determined by the position of the pin 316.

The orientation of the first mirror 301 in the viewing position can be easily adjusted by turning the eccentric pin 309, and that of the second mirror 303 in the same position also can be easily adjusted by turning the eccentric pin 316.

Though, in the foregoing or fourth embodiment, the first and second mirror brackets 302 and 304 are constructed in the pivotal form, they may be otherwise constructed by using a link mechanism to effect an equivalent result.

As has been described above, one of the features of the fourth embodiment is that use is made of a pin fixedly mounted on the camera housing against which the closing spring urges the second mirror support means to abut at a first abutment thereof, and it is by this pin that the opening position of the second mirror is determined. Another feature is that upward movement of the first mirror is transmitted to close the second mirror through the operative connection of the second abutment with that pin. Still another feature is that the second mirror in the non-viewing position is barred from opening by that pin in contact with the second abutment, whereby the adjusting operation for the closing position of the second mirror is made unnecessary, while permitting the opening position to be adjustable independently. Thus, a great increase in the accuracy of position control can be achieved very easily.

From the above is produced another advantage that even if the first mirror is allowed to overrun the upper terminal end of pivotal movement thereof by its inertia, no improper force is applied to the second mirror. Therefore, the deforming problem does not take place, and surplus means for preventing this deformation is not necessary.

From the second feature, there is provided an advantage in what the second mirror is closed early and does not interfere with the focusing screen holder.

A further feature is that a spring for urging the second mirror in the closing direction may be installed before the mirror device is built into the camera housing, whereby the efficiency of the assembly line is improved. Also there is no need to create a particularly large a space. Therefore, the space efficiency is improved. These improved results facilitate a minimization of the bulk and size of the camera. Since the second abutment is formed to such a shape that upon arriving at the upper terminal end of movement, the second mirror is blocked from bouncing, there is a further advantage in that the mirror device is freed from vibrations of the second mirror.

As has been described above, the present invention provides a mirror device for a camera having a pivotal first mirror and a pivotal second mirror with its fulcrum on the support means for the first mirror, in which the accuracy of adjustment of the opening and closing positions of the second mirror relative to the first mirror can be increased.

Also, the present invention can be obtain the various advantages described in connection with the features of each of the embodiments thereof.

While specific embodiments of invention have been shown and described in detail to illustrate the application of the inventive principles, it will be understood that the invention may be embodied otherwise without departing from such principles.

What is claimed is:

1. A mirror device for a camera having a camera body, comprising:
    (a) a first mirror arrangement including a first mirror arranged to swing from a finder-viewing position to an exposure position;
    (b) a second mirror arrangement including a second mirror arranged to swing about a fulcrum on said first mirror arrangement;
    (c) bias means for urging said second mirror in a closing direction relative to said first mirror, said bias means being held by at least one of said first mirror and said second mirror, said bias means urging said second mirror in the closing direction at both the finder-viewing position and the exposure position of said first mirror;
    (d) at least one abutment portion formed in said camera body;
    (e) a first abutment portion formed in said second mirror arrangement, said first abutment portion in contact with said abutment portion formed in said camera body swinging said second mirror in an opening direction as said first mirror swings from the exposure position to the finder-viewing position; and
    (f) a second abutment portion formed in said second mirror arrangement, said second abutment portion in contact with said abutment portion in said camera body swinging said second mirror in a closing direction as said first mirror swings from the finder-viewing position to the exposure position.

2. A mirror device according to claim 1, wherein said abutment portion formed in said camera body is formed as one abutment portion so as to contact with both of said first and said second abutment portions.

3. A mirror device according to claim 2, wherein said first and second abutment portions are positioned on either side of said abutment portion formed in said camera body.

4. A mirror device according to claim 1, wherein said abutment portion formed in said camera body is a fixed pin.

5. A mirror device according to claim 1, wherein when said first mirror arrangement completes swinging to the exposure position, said second abutment portion of said second mirror arrangement is released from contact with said abutment portion of said camera body to form a space therebetween.

6. A mirror device according to claim 1, wherein said first mirror has a semi-permeable portion formed therein and in the finder-viewing position, light coming from an object to be photographed and transmitted past said semi-permeable area is reflected by said second mirror to a specified direction.

7. A mirror device for a camera having a camera body comprising:
    (a) a first mirror arrangement including a first mirror arranged to swing from a finder-viewing position to an exposure position;
    (b) a second mirror arrangement including a second mirror arranged to swing about a fulcrum on said first mirror arrangement;
    (c) bias means urging said second mirror in a closing direction relative to said first mirror;
    (d) at least one abutment portion formed in said camera body;
    (e) a first abutment portion formed in said second mirror arrangement, said first abutment portion in contact with said abutment portion formed in said camera body swinging said second mirror in an opening direction as said first mirror swings from the exposure position to the finder-viewing position; and (f) a second abutment portion formed in said second mirror arrangement, said second abutment portion in contact with said abutment portion in said camera body swinging said second mirror in a closing direction as said first mirror swings from the finder-viewing position to the exposure position, wherein said second abutment portion is made to contact said abutment portion formed in said camera body until just before the exposure position as said first mirror swings from the finder-viewing position to the exposure position, whereby said second mirror is swung to the closing direction and when said second mirror bounces to the opening direction in the exposure position, said second abutment portion and the abutment portion formed in said camera body contact each other again.

8. A mirror device for a camera, comprising:
(a) a first mirror arrangement including a first mirror arranged to swing from a finder-viewing position to an exposure position;
(b) a second mirror arrangement including a second mirror arrangement to swing about a fulcrum on said first mirror arrangement;
(c) bias means urging said second mirror in a closing direction relative to said first mirror, said biasing means being held by at least one of said first mirror and said second mirror, said bias means urging said second mirror in the closing direction at both the finder-viewing position and the exposure position of said first mirror;
(d) at least one fixed abutment portion;
(e) a first abutment portion formed in said second mirror arrangement, said first abutment portion in contact with said fixed abutment portion swinging said second mirror in an opening direction as said first mirror swings from the exposure position to the finder-viewing position; and
(f) a second abutment portion formed in said second mirror arrangement, said second abutment portion in contact with said fixed abutment portion swinging said second mirror to the closing direction as said first mirror swings from the finder-viewing position to the exposure position.

9. A mirror device according to claim 8, wherein said first mirror has a semi-permeable portion formed therein and in the finder-viewing position, light coming from an object to be photographed and transmitted past said semi-permeable area is reflected by said second mirror to a specified direction.

10. A mirror device according to claim 8, wherein when said first mirror arrangement completes swinging to the exposure position, said second abutment portion of said second mirror arrangement is released from contact with said fixed abutment to form a space therebetween.

11. A mirror device of a camera, comprising:
(a) a first mirror arrangement including a first mirror arranged to swing from a finder-viewing position to an exposure position;
(b) a second mirror arrangement including a second mirror arranged to swing about a fulcrum on said first mirror arrangement;
(c) bias means urging said second mirror in a closing direction relative to said first mirror, said biasing means being held by at least one of said first mirror and said second mirror arrangement, said bias means urging said second mirror in the closing direction at both the finder-viewing position and the exposure position of said first mirror;
(d) a cam surface for controlling the swing of the second mirror arrangement by abutment of a cam surface provided on one of a camera body and said second mirror arrangement, a cam follower being provided on the other one of said camera body and said second mirror arrangement, said cam surface and said cam follower being brought into sliding contact with each other by the urging force of said biasing means, and said cam surface swinging said second mirror arrangement in the opening direction during the swinging of said first mirror arrangement from a photographic retreated position to a finder-viewing position; and
(e) bounce preventing means for preventing said second mirror arrangement from bouncing in the opening direction at the finish of the swing to the photographic retreated position, said bounce preventing means including a preventive surface which comes into contact with said cam follower to prevent further bouncing of said second mirror arrangement when said second mirror arrangement swings in the opening direction at the photographic retreated position, said preventive surface being integrated with said cam surface.

12. A device according to claim 11, wherein said cam surface and said preventive surface are formed integrally on both sides of said cam follower.

13. A device according to claim 12, further comprising a second cam surface formed almost in parallel to a cam displacement zone in said first cam surface and is continuously formed with said preventive surface.

14. A mirror device according to claim 11, wherein when said first mirror arrangement completes swinging to the exposure portion, said cam surface is released from contact with said cam follower to form a space therebetween.

* * * * *

UNITED STATES PATENT AND TRADEMARK OFFICE
CERTIFICATE OF CORRECTION

PATENT NO. : 4,843,420

DATED : June 27, 1989

INVENTOR(S) : Tsuyoshi Fukuda, et al.

It is certified that error appears in the above-identified patent and that said Letters Patent is hereby corrected as shown below:

COLUMN 5:

Line 60, "pivoted" should read --pivotal--.

COLUMN 6:

Line 68, "increase" should read --increase in--.

COLUMN 7:

Line 36, "fixed" should read --fixedly--.

COLUMN 8:

Line 27, "spring 22," should read --spring 211,--.

COLUMN 9:

Line 38, "13B and FIGS. 14Ato" should read --13E and FIGS. 14A to--.

UNITED STATES PATENT AND TRADEMARK OFFICE
CERTIFICATE OF CORRECTION

PATENT NO. : 4,843,420

DATED : June 27, 1989

INVENTOR(S) : Tsuyoshi Fukuda, et al.

It is certified that error appears in the above-identified patent and that said Letters Patent is hereby corrected as shown below:

COLUMN 11:

Line 33, "what" should read --that--.

Line 55, "be" should be deleted.

Signed and Sealed this

Seventeenth Day of July, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,843,420
DATED : June 27, 1989
INVENTOR(S) : TSUYOSHI FUKUDA, et al.

It is certified that error appears in the above-identified patent and that said Letters Patent is hereby corrected as shown below:

<u>On the Cover Page</u>

<u>Related U.S. Application Data</u>

[60]   ", abandoned." (second occurrence) should read
       --Pat. No. 4,673,278--.

Signed and Sealed this

Second Day of March, 1993

Attest:

STEPHEN G. KUNIN

*Attesting Officer*   *Acting Commissioner of Patents and Trademarks*